United States Patent
Moeller et al.

(10) Patent No.: US 6,538,787 B1
(45) Date of Patent: Mar. 25, 2003

(54) APPARATUS AND METHOD FOR POLARIZATION MODE DISPERSION EMULATION AND COMPENSATION

(75) Inventors: Lothar Moeller, Hazlet, NJ (US); Herwig Kogelnik, Rumson, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/404,892

(22) Filed: Sep. 24, 1999

(51) Int. Cl.[7] ................................................ H04B 10/00
(52) U.S. Cl. ....................... 359/161; 359/156; 359/249; 385/11; 372/25; 372/27
(58) Field of Search ................................ 359/161, 158, 359/177, 183, 156, 249, 140; 385/37, 11, 27, 28; 372/25, 27, 29.01, 30

(56) References Cited

U.S. PATENT DOCUMENTS 6,163,393 A  *  12/2000  Wu et al. ................... 359/122
6,330,375 B1 *  12/2001  Fishman et al. ............. 359/122
6,370,286 B1 *   4/2002  Krol et al. ................... 359/484

* cited by examiner

Primary Examiner—Nina Tong

(57) ABSTRACT

A polarization mode dispersion (PMD) emulator may include one or more modular "cells" that emulate PMD. Each of the cells may include optical delay and phase modulation components. The optical delay and/or the phase modulation components may be adjusted to account for differences in PMD and two or more of the cells may be combined to further adjust the overall PMD of the apparatus. Similarly, a PMD compensator may include one or more modular "cells" that compensate for PMD, with each of the cells including optical delay and phase modulation components. The optical delay and/or the phase modulation components may be adjusted to compensate for various PMD values and two or more of the cells may be combined to further adjust the overall PMD compensation of the apparatus. The PMD compensator apparatus may be used to compensate for PMD in wideband applications, such as wavelength division multiplexed (WDM) systems.

29 Claims, 13 Drawing Sheets

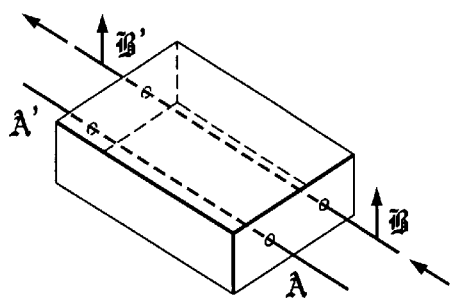

$$\begin{pmatrix}\mathfrak{A}'\\\mathfrak{B}'\end{pmatrix}=e^{j\gamma(\omega)}\begin{bmatrix}1 & 0\\0 & 1\end{bmatrix}\begin{pmatrix}\mathfrak{A}\\\mathfrak{B}\end{pmatrix};$$

FIG. 9B

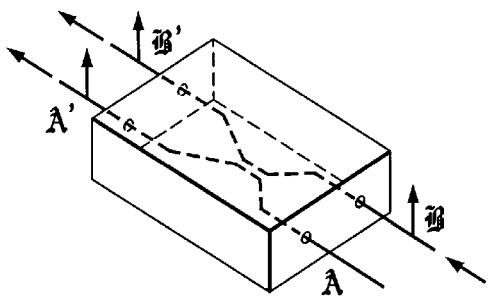

$$\begin{pmatrix}\mathfrak{A}'\\\mathfrak{B}'\end{pmatrix}=e^{j\gamma(\omega)}\begin{bmatrix}\frac{1}{\sqrt{2}} & \frac{-j}{\sqrt{2}}\\\frac{-j}{\sqrt{2}} & \frac{1}{\sqrt{2}}\end{bmatrix}\begin{pmatrix}\mathfrak{A}\\\mathfrak{B}\end{pmatrix};$$

FIG. 9C

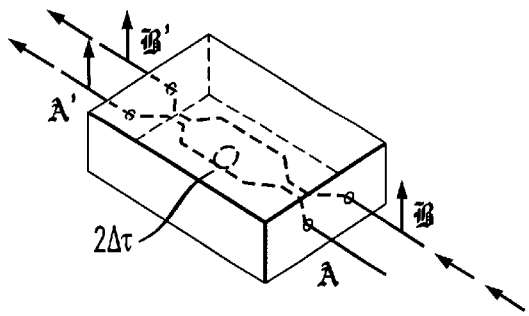

$$\begin{pmatrix}\mathfrak{A}'(\omega)\\\mathfrak{B}'(\omega)\end{pmatrix}=e^{j\gamma(\omega)}\begin{bmatrix}-sin(\Delta\tau\omega) & cos(\Delta\tau\omega)\\cos(\Delta\tau\omega) & sin(\Delta\tau\omega)\end{bmatrix}\begin{pmatrix}\mathfrak{A}(\omega)\\\mathfrak{B}(\omega)\end{pmatrix}$$

1300

INVERSE PMD AND WDM CHANNELS

ARTIFICIAL INVERSE PMD

1500

APPARATUS AND METHOD FOR POLARIZATION MODE DISPERSION EMULATION AND COMPENSATION

FIELD OF THE INVENTION

The invention relates to polarization mode dispersion and, more particularly, to the emulation of and compensation for such dispersion in optical fibers.

BACKGROUND OF THE INVENTION

Tremendous quantities of information are transmitted as pulses of light over long distances through optical fibers. Ideally, the light pulses employed to encode the information for transmission would be as brief as light-modulating technology would permit. Using such short-duration pulses would enable the transmission of data at rates substantially greater than any rates currently available. But, among other impediments, distortion of the light pulses severely limits the rate at which the pulses may be intelligibly transmitted. That is, a variety of pulse distortion mechanisms increase the bit error rate (BER) to unacceptable levels at much lower transmission rates than would be dictated by the rapidity of light-modulating capabilities alone. Modal dispersion, for example, can severely distort pulses as they travel along an optical fiber. However, chromatic dispersion can be substantially eliminated through the use of single-mode optical fibers. Another form of pulse distortion, one which significantly contributes to the limitations of light-based information transmission and which is substantially unaffected by the use of single-mode fiber, is that of polarization mode dispersion (PMD). PMD is discussed, for example, in W. Eickhoff, Y. Yen and R. Ulrich, Applied Optics, Vol 20, 3428, 1981, which is hereby incorporated by reference. PMD, briefly, causes a frequency dependent variation in the polarization state of light injected into a fiber, resulting in pulse distortion. All optical fibers that are suitable for optical information transmission, including single mode fibers, exhibit PMD to a greater or lesser degree. Consequently, PMD may be the limiting factor for the transmission of data through any optical fiber.

Random changes in the birefringence of an optical fiber that occur along the light path cause PMD phenomena. These phenomena lead to the distortion of light pulses which travel along the light path and penalize the operation of fiber-based systems, particularly for high bit-rate operations. The PMD of a fiber is commonly characterized by two specific orthogonal states of polarization, called the principal states of polarization (PSP), and the differential group delay (DGD) between the PSPs. Typical DGD values are on the order of 1 to 100 psec.

First order PMD compensators are known and discussed, for example, in F. Heismann et al, ECOC 98 p. 529–530, Madrid 98, and D. Schlump et al, ECOC98, pp. 535–53, Madrid 98, which are hereby incorporated by reference in their entirety. Nevertheless, because the bit-rate of single channel transmission systems has reached the 40 Gb/s region, the impact of higher order PMD may become a limiting factor in fiber-optic data transmission. PMD compensators suitable for higher order PMD compensation have been discussed by J. Patscher et al, Electronic Letters, 1997, 33, pp.1157–9, and R. Noe et al, ECOC 98, post deadline, pp157–8, Madrid 98, which are hereby incorporated by reference, Theoretical and experimental studies of effects caused by 2nd order PMD have been reported by C. Francia et al, ECOC 98 pp.143–144, Madrid 1998 and C Francia et al, IEEE PTL, pp. 1739–1741, Dc. 1998, which are hereby incorporated by reference. Methods for 1st and 2nd order PMD measurement have also been demonstrated, for example, by L. Nelson et al, submitted to ECOC 99, Nice 1999, which is hereby incorporated by reference. However, determining the influence of 2nd order PMD on a signal or evaluating the performance of 2nd order PMD compensators can not easily be done due to the fact that installed fibers have in general PMD of higher than 2nd order, and the known methods for emulating 2nd PMD have the disadvantage of generating simultaneously uncontrollable higher order PMD effects.

In order to accurately characterize the data transmission capacity of an optical fiber and an associated data transmission system it would be highly desirable to emulate the PMD of a fiber. Additionally, to improve the performance of such a fiber and its associated data transmission system, it would be highly desirable to compensate for such PMD.

SUMMARY

In accordance with the principles of the present invention, an emulator may limit PMD generation to 1st and 2nd order (Where the definition of $1^{st}$ and $2^{nd}$ order conform to that of C. Francia et al, ECOC 98 pp. 143–144, Madrid 1998 and C Francia et al, IEEE PTL, pp. 1739–1741, Dc. 1998, previously discussed). Such an embodiment may be employed for PMD compensator testing as well as studying the impact of third and higher order PMD effects. By emulating 1st and 2nd order PMD and making a comparison between the transmitted signals over installed fibers and the adjusted emulator with same PMD parameters for 1st and 2nd order, unambiguous studies of higher order PMD effects can be conducted. Additionally a 2nd order PMD compensator in accordance with the principles of the present invention may be employed to compensate for higher order PMD, thereby improving the data transmission capabilities of optical fibers.

A polarization mode dispersion (PMD) emulation apparatus in accordance with the principles of the present invention may include one or more modular "cells" that emulate PMD. In an illustrative embodiment each of the cells include optical delay and phase modulation components. The optical delay and/or the phase modulation components may be adjusted to account for differences in PMD and two or more of the cells may be combined to further adjust the overall PMD of the apparatus.

A PMD compensation apparatus in accordance with the principles of the present invention may include one or more modular "cells" that compensate for PMD. In an illustrative embodiment each of the cells include optical delay and phase modulation components. The optical delay and/or the phase modulation components may be adjusted to compensate for various PMD values and two or more of the cells may be combined to further adjust the overall PMD compensation of the apparatus. In another aspect of the invention, the compensation apparatus may be used to compensate for PMD in wideband applications, such as wavelength division multiplexed (WDM) systems.

BRIEF DESCRIPTION OF THE DRAWINGS

The above and further features, aspects, and advantages of the invention will be apparent to those skilled in the art from the following detailed description, taken together with the accompanying drawings in which:

FIGS. 9A through 9C are schematic representations of physical implementations of lossless unipolar 2×2 filters such as may be employed in the construction of a compensator in accordance with the principles of the present invention;

DETAILED DESCRIPTION

Figure 1:
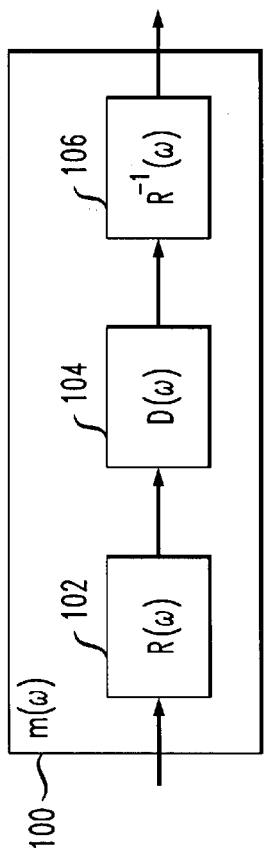
FIG. 1 is a conceptual block diagram of components employed in the emulation of PMD in accordance with the principles of the present invention.

In accordance with the principles of the invention, a complete 1st and 2nd order PMD emulatior may be effected with a series of three elements characterized by the three transfer functions, $R(\omega)$, $R^{-1}(\omega)$, and $D(\omega)$, as illustrated in the functional level block diagram of FIG. 1. The specifics of the transfer functions are discussed in greater detail below, with $R(\omega)$ and $R^{-1}(\omega)$, described by Equation 4, and $D(\omega)$ described by equation 5. Illustrative physical embodiments in accordance with the principles of the present invention are described in the discussion related to FIGS. 3 through 5.

At the functional level depicted by FIG. 1, PMD is modeled such that a 2×2 complex transfer matrix $T(\omega)=\exp[-(\alpha+j\beta(\omega))z]M(\omega)$ describes the linear signal propagation in a fiber with negligible Polarization Dependent Loss (PDL), where $\alpha$ is the fiber attenuation and $\beta(\omega)$ is the mean propagation constant. The emulator 100 may include an element 102 $R(\omega)$ which models the fiber's frequency dependent rotation of the principal states of polarizations (PSPs), followed by an element 104 and $D(\omega)$ which models the fiber's different group delays of two PSPs. An element 106 $R^{-1}(\omega)$ inverts the frequency dependent rotation of the PSPs performed by element 102.

Polarization mode dispersion may be described using the Jones calculus. The notation used hereinafter is similar to that in, C Franscia et al, ECOC 98, pp. 143–144, Madrid 1998, which is hereby incorporated by reference and in which the basic assumption of the PMD model is that a 2×2 complex transfer matrix $T(\omega)=\exp[-(\alpha+j\beta(\omega))z]M(\omega)$ describes the linear signal propagation in a fiber with negligible Polarization Dependent Loss (PDL) where a is the fiber attenuation and $\beta(\omega)$ is the mean propagation constant. The Jones matrix $M(\omega)$ is a unitary matrix.

$$M(\omega) = \begin{bmatrix} u_1(\omega) & u_2(\omega) \\ -u_2(\omega)^* & u_1(\omega)^* \end{bmatrix} \tag{1}$$

with $|u1|2+|u2|2=1$. The matrix $M(\omega)$ can be written as $$M(\omega)=R^{-1}(\omega)D(\omega)R(\omega), \tag{2}$$

where $R(\omega)$ takes into account the rotation of the Principal States of Polarizations (PSPs) and $D(\omega)$ the different group delays of the two PSPs $$R(\omega) = \begin{bmatrix} m(\omega) & n(\omega) \\ -n(\omega)^* & m(\omega)^* \end{bmatrix}; \tag{2}$$

$$D(\omega) = \begin{bmatrix} \exp(-j\phi/2) & 0 \\ 0 & \exp(j\phi/2) \end{bmatrix} \tag{3}$$

with $m(\omega)=\cos(\theta)\cos(\varepsilon)+j\sin(\theta)\sin(\varepsilon)$ and $n(\omega)=\sin(\theta)\cdot\cos(\varepsilon)+j\cos(\theta)\sin(\varepsilon)$, where $\theta=\theta(\omega)$ is the azimuth and $\varepsilon=\varepsilon(\omega)$ the ellipticity of the eigenfunctions of M at the frequency $\omega$, and $\Delta\tau=d\phi/d\omega$ is the Differential Group Delay (DGD) of the fiber.

Since $\Delta\tau$, $\theta$ and $\varepsilon$ are regular functions of $\omega$ they can be expanded up to any order around the central frequency of a signal spectrum in Taylor series $\Delta\tau=\Delta\tau 0+\Delta\tau 1\omega+\Delta\tau 2\omega 2/2+.$, $\theta=\theta 0+\theta 1\omega+\theta 2\omega 2/2+\ldots$ and $\varepsilon=\varepsilon 0+\varepsilon 1\omega+\varepsilon 2\omega 2/2+\ldots$ Following the discussions given in C. Francia et al, ECOC 98 pp. 143–144, Madrid 1998 and C Francia et al, IEEE PTL, pp. 1739–1741, Dc. 1998, which are hereby incorporated by reference, $\varepsilon$ may be set=0. By taking only 1st and 2nd order PMD effects into account ($\Delta\tau=\Delta\tau_0+\Delta\tau_1\omega$, $\theta=\theta_1\omega=k\omega$), $R(\omega)$, $D(\omega)$ and $R^{-1}(\omega)$ become:

$$R^{\pm 1}(\omega) = \begin{bmatrix} \cos(k\omega) & \pm\sin(k\omega) \\ \mp\sin(k\omega) & \cos(k\omega) \end{bmatrix}; \tag{4}$$

$$D(\omega) = \begin{bmatrix} d(\omega) & 0 \\ 0 & d^*(\omega) \end{bmatrix} \tag{5}$$

with $d(\omega)=\exp(j(\Delta\tau_0\ \omega+(1/2)\Delta\tau_1\omega^2)/2$. In accordance with the principles of the invention, a complete 1st and 2nd order PMD emulator may be effected with a series of three elements characterized by the three transfer functions of Equations 4 and 5. That is, a complete $1^{st}$ and $2^{nd}$ order PMD emulator may be constructed with a series combination of elements having the three transfer functions, $R(\omega)$, $R^{-1}(\omega)$, and $D(\omega)$, as illustrated in the block diagram of FIG. 1.

Figure 2:
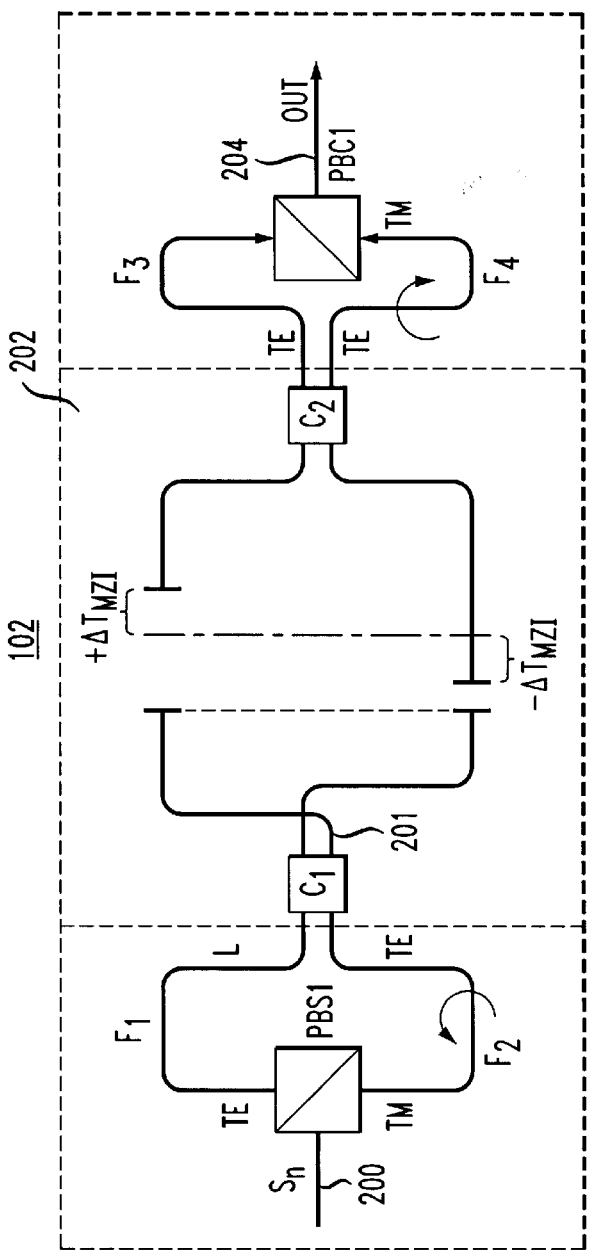
FIG. 2 is a more detailed diagram of an element of the emulator of FIG. 1.

The conceptual block diagram of FIG. 2 illustrates in greater detail the new emulation element 102 (also employed as element 106) of FIG. 1. The element 102 emulates the transfer characteristic of the frequency dependent rotation matrix $R(\omega)$, or $R^{-1}(\omega)$. In operation, an input optical signal, labeled "$S_{in}$", enters the element 102 at an input port 200. A Polarization dependent Beam Splitter (PBS), labeled PBS1 separates the arbitrarily polarized input signal into transverse electrical (TE) and transverse magnetic (TM) modes. The TE and TM modes are respectively coupled into polarization maintaining fibers (PMFs) F1 and F2. Each mode is coupled into one of the principal states of polarization of the associated fiber. That is, the TE mode is coupled into one of the principal states of polarization of the fiber F1 and the TM mode is coupled into one of the principal states of polarization of the fiber F2.

The Fiber F2 rotates the polarization of the mode contained therein by 90° by physically rotating the fiber 90°. This polarization rotation orients the output fields emerging from fibers F1 and F2 in parallel when they enter the Mach-Zender Interferometer (MZI) 202 through the 3 dB coupler labeled $C_1$. Other means, such as a Faraday rotator, may be employed to rotate the mode. The MZI 202 includes two paths between 3 dB couplers $C_1$ and $C_2$. The output paths are crossed, as indicated at 201 to effect the matrix of equation 4. One path, labeled $+\Delta T_{MZI}$, contributes a delay of $+\Delta TMZI$, and the other path, labeled $-\Delta TMZI$, contributes a delay of $-\Delta T_{MZI}$. In this way, in both paths between the couplers $C_1$ and $C_2$ of the MZI, time delays of equal amounts but different signs ($\pm \Delta TMZI$) cause a phase shift between the two propagating signals before they are combined in C2. The phase shift between the two propagating signals produces a frequency dependent interference effect at the output of C2. The output signals of C2 (pure TE polarization) are injected into fibers F3 and F4. Fiber F4, which is physically rotated 90°, in a manner similar to fiber F2, imparts a 90° rotation of the injected mode and results in a TE→TM conversion of the guided signal. Again, this rotation may be achieved it through other means, such as a Faraday rotator, for example. Both modes are combined in a Polarization dependent Beam Combiner (PBC), labeled PBC1. The combined signal is available at the output, labeled out.

The mode conversion process carried out by the element 102 may be described in greater detail, as follows. Assuming the electrical field of an incoming monochromatic wave to be described by $\mathrm{Sin}(t) = [\gamma TE, \gamma TM] \exp(-j\omega t)$, where $\gamma TE$, $\gamma TM$ stand for the amplitudes of the modes, PBS1 together with F1 and F2 are used to map the coefficients $\gamma TE$, $\gamma TM$ to a vector $v = [\gamma TE, \gamma TM]$ which can be combined with the transfer matrix C1 of the lossless, wavelength independent coupler C1 given by:

$$C_1 = \frac{1}{\sqrt{2}} \begin{bmatrix} 1 & -j \\ -j & 1 \end{bmatrix} \quad (6)$$

The elements of the vector v ($v = [\gamma TE, \gamma TM]$) are now interpreted as amplitudes of the injected waves in port 1 and 2 of C1. The delay section of the MZI 202 may be modeled as a matrix using the phase shifts in both paths of the MZI, including the cross-over path 201 of FIG. 2 as:

$$G(\omega) = \begin{bmatrix} 0 & \exp(+j \Delta T_{MZI}(\omega)) \\ \exp(-j \Delta T_{MZI}(\omega)) & 0 \end{bmatrix} \quad (7)$$

Using the same transfer matrix for C2 as for C1, that is, the transfer matrix of equation 6, the relevant MZI transfer matrix C2 $G(\omega)$) C1=$Y(\omega)\equiv -R(\omega)$ (Eq.4) with K=$\Delta T_{MZI}$. The element 102 produces an output signal at the output 204 having a wave polarization vector $v'(\omega) = Y(\omega)$ v. This wave polarization vector is identical to that described by Eq.4, except a negligible minus sign. The elements of $v'(\omega)$ represent the amplitude of the TE and TM modes.

Figure 3:
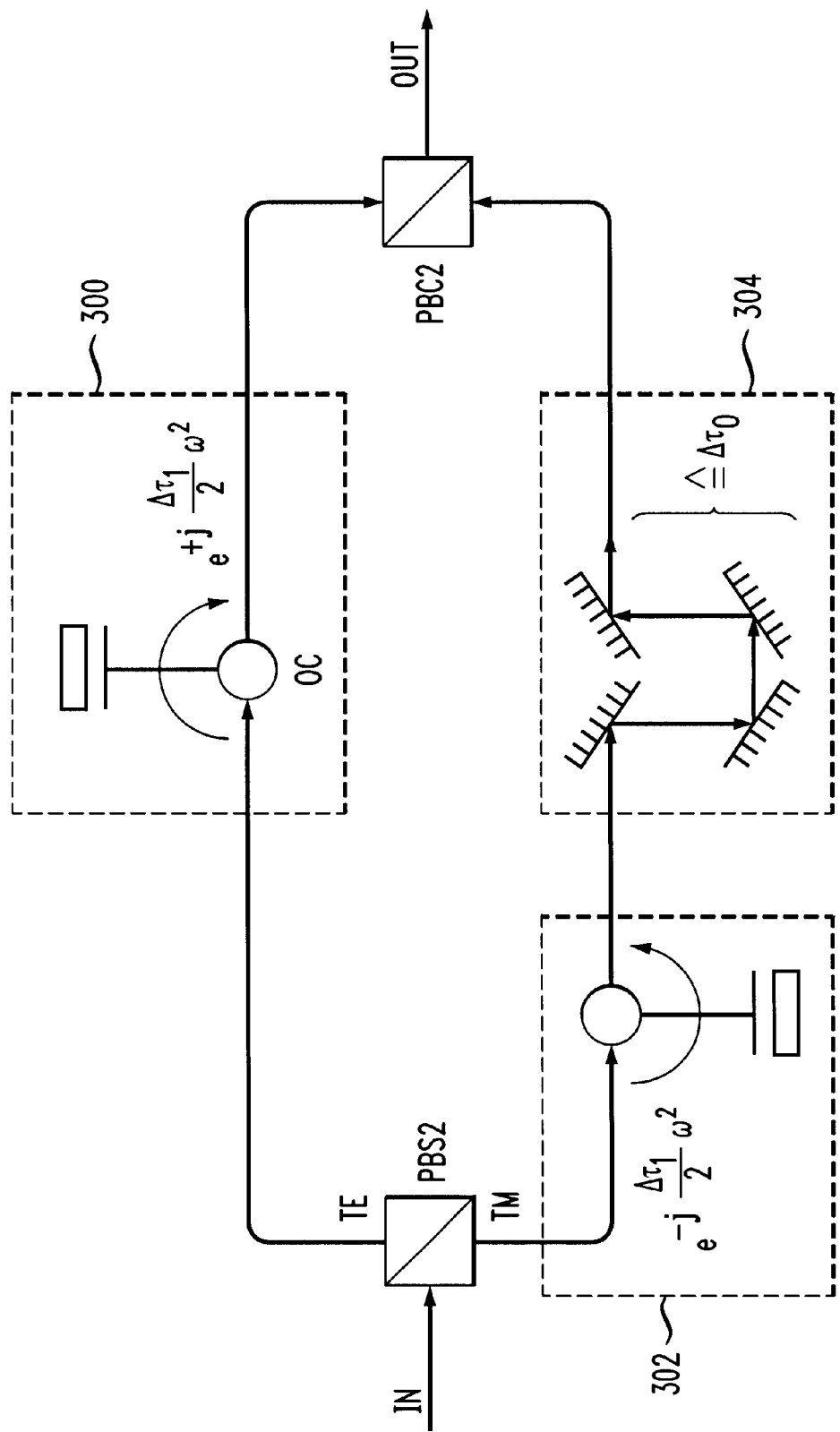
FIG. 3 is a more detailed diagram of another element of the emulator of FIG. 1.

In accordance with the principles of the present invention, the transfer characteristic of $D(\omega)$ may be implemented as illustrated in the conceptual block diagram of FIG. 3. An incoming signal is split into TE and TM modes by the polarization dependent beam splitter PBS2. The TE mode component is routed to a dispersion tuning device 300 comprising an optical circulator OC and having chromatic dispersion characterized by the term: $\exp(+j\Delta\tau 1\omega^2/2)$. Such devices are known and discussed, for example, in L Cimini et al, IEEE PTL, pp. 200–202, March 1990, and C. Madsen et al, OFC 00, FE6-1, pp. 99–101, San Diego 99, and ECOC 99, Nice 99, all of which are hereby incorporated by reference in their entirety. The device 300 allows the TE signal's dispersion to be continuously tuned. The output of the dispersion tuning device 300 is connected to a polarization dependent beam combiner PBC2 where the TE signal is combined with the TM signal. In the other path, the TM signal is fed to a dispersion tuning device 302 similar to dispersion tuning device 300. However, the dispersion tuning device 302 exhibits a chromatic dispersion characterized by the term: $\exp(-j\Delta\tau 1\omega^2/2)$. The output of the dispersion tuning device 302 is routed to a variable delay line 304, and, from there, to be combined with the TE mode signal in the polarization dependent beam combiner PBC2. Due to their limited optical bandwidth, no optical allpass filter can purely satisfy these filter conditions, but in a frequency interval comparable to the bandwidth of a data modulated optical carrier, the assumption is reasonable. In PBC2 the signals of both paths are superimposed. The signal may then be re-rotated, for example, with an element similar to that described in the discussion related to FIG. 2, the difference being a reversed sign ($+\Delta T_{MZI} \to -\Delta T_{MZI}$) to conform to Eq.4.

Figure 4:
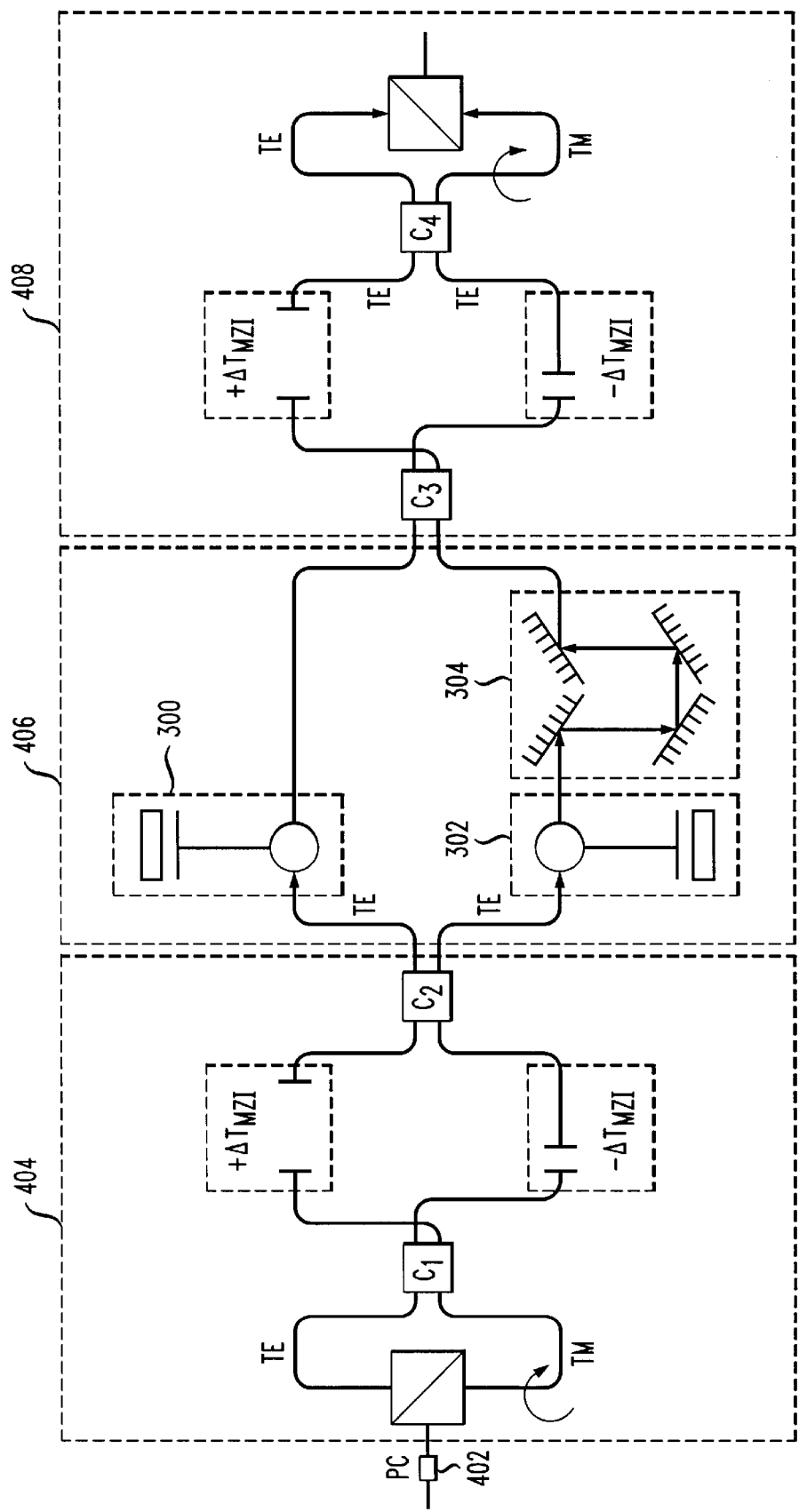
FIG. 4 is a more detailed view of the emulator of FIG. 1, with the elements of FIGS. 2 and 3 in combination.

An illustrative embodiment of an emulator 400 in accordance with the principles of the present invention is depicted in the conceptual block diagram of FIG. 4, where the incoming signal is first introduced to a polarization controller 402 that is employed to control the polarization of the incoming signal. This control is employed in recognition of the fact that the incoming signal is determined by two additional parameters $\theta 0$ ($\theta = \theta 0 + \theta 1\omega$) and $\varepsilon$ which can be set to zero in the numerical calculation. Compensation of this parameter choice and a fitting of the model to a physical system can be achieved by defining corresponding parameters $\theta in(\neq \omega)$ and $\varepsilon in$ ($\neq \omega$) for the incoming signal. Functional blocks 404, 406, and 408 respectively realize the functions $R(\omega)$, $D(\omega)$, and $R^{-1}(\omega)$ as previously described in relation to the discussion of FIGS. 1 through 3. More specifically, the MZIs situated between couplers C1 and C2, and C3 and C4 perform the functions described in the discussion related to FIG. 2, and the block 406 performs the function described in the discussion related to FIG. 3.

Because first Order PMD can cause delay times $\Delta\tau_0$ of up to 100 ps, the variable free space delay line should cover a length of 0 . . . 3 cm. From $\Omega(\omega) = \Delta\tau$ s, where s is one of two orthogonal eigenvectors of $M(\omega)$ and $\Omega(\omega)$ stands for the dispersion vector, $|\partial\Omega/\partial\omega|2 = \Delta\tau_1^2 + 16|k|^2 \Delta\tau_0^2$. Thus, 2nd order PMD parameters of a fiber with 40 ps mean PMD can be estimated to be in a range of $\Delta T_{MZI} = |k| = \approx 0$ . . . 50 ps, which is equivalent to a free space delay line with tunable length of 0 . . . 1.5 cm. Devices described in the paper by Madsen et al, previously incorporated by reference, can generate a tunable dispersion of $\Delta\tau_1 \approx +/-0$ . . . 1500 ps$^2$ which is sufficiently large for emulating the corresponding PMD amounts of a high PMD fiber which are estimated to be in a range of $\approx +/-0$ . . . 1000 ps$^2$.

A PMD compensator, also referred to hereinafter as a filter, in accordance with the principles of the present invention may include a polarization controller and one or more differential delay cells. The polarization controller may be employed to control the polarization of an input signal before it is introduced to the one or more differential delay cells. The delay cells may be implemented as Mach-Zehnder interferomters, for example. The MZI function may, in turn, be implemented as 2×2 filters, as described in greater detail in the discussion related to FIG. 7 and subsequent Figures. The new PMD compensator exhibits a transfer function which, when matrix multiplied by the polarization transfer function matrix of the optical device, such as a fiber, which creates the PMD being compensated for, yields the unity matrix. That is, the matrix transfer function of the compensator is the inverse of the matrix transfer function of the optical device which creates the PMD.

Figure 5:
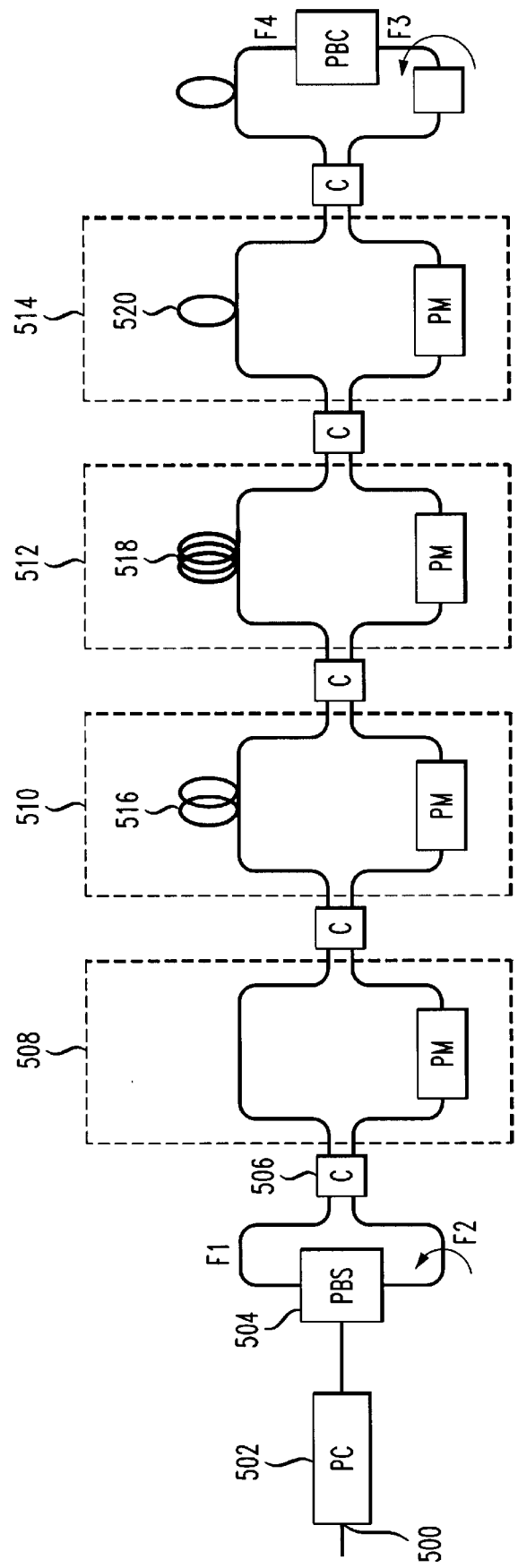
FIG. 5 is a conceptual block diagram of a PMD compensator in accordance with the principles of the present invention.

A physical realization of a compensator that exhibits the transfer function M'(ω) is illustrated in the conceptual block diagram of FIG. 5. This is an illustrative embodiment and it should be understood that the various elements may be employed in different sequences and combinations. A signal exhibiting PMD may be inserted at the input 500 and travel from the input 500 to a polarization controller 502 which is connected at its output to a polarization beam splitter 504. The polarization beam splitter splits the signal into two fundamental modes, that is, the TE and TM modes. The polarization of one of the outgoing modes is converted into the orthogonal mode, in this illustrative embodiment, by a fiber F2 that is physically rotated 90°. As previously noted, this mode conversion may be accomplished through other means, such as a Faraday rotator, for example. Either mode, that is, the TE or the TM mode, may be converted to its orthogonal counterpart; the point is to convert one mode into the other so that they may constructively interfere in the remainder of the compensator. The fibers F1 and F2 are connected to a 3 dB coupler 506 to a chain of Mach-Zehnder Interferometers 508, 510, 512, and 514. Each interferometer includes a phase modulator, labeled PM, and interferometers 510–514 include optical delay lines 516, 518, and 520, respectively. The delay lines and phase modulators are chosen to compensate for PMD within a fiber attached to the input 500. Such phase modulators may be Kerr-effect devices, or thermal expansion devices, for example. At the output of the Mach-Zehnder chain fiber F3 converts one mode into the orthogonal mode by a physical rotation of the fiber, as previously described. The two modes are then combined in the polarization beam combiner PBC.

The compensator, or filter, 501 functions as an all-pass filter. That is, no power is lost in the filter 501. The filter coefficients are determiend by the phase shift in the phase modulators and the length of the delay lines of the Mach-Zehnder iterferometers. The filter characteristics may be adjusted by varying the phase shifts of the phase modulators, thereby achieving appropriate compensation.

Figure 6:
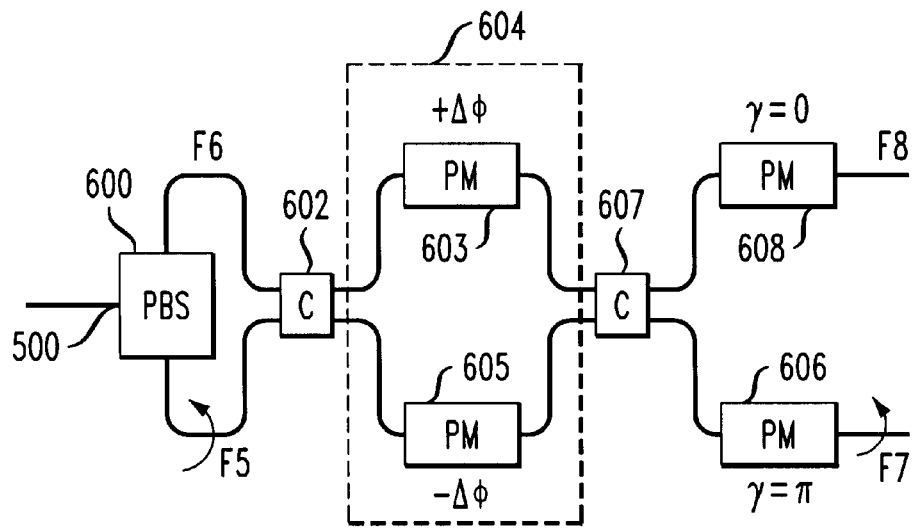
FIG. 6 is a conceptual block diagram of a polarization controller which may be employed in combination with emulators and compensators.

The polarization controller 502 of FIG. 5, used to fit the signal arriving from the optical fiber to the remainder of the compensator, may be implemented in accordance with the principles of the invention as illustrated in the conceptual block diagram of FIG. 6. Light signals enter the polarization controller at the input 500 and are introduced to a polarization beam splitter 600 which splits the signal into TE and TM modes. The TE and TM modes are coupled into optical fibers F6 and F7 and one of the modes is converted into its orthogonal counterpart. The mode conversion may be accomplished, as previously described, by physically rotating one of the fibers 90°, as is F5 is this illustrative embodiment. The split signals are coupled through a coupler 602 to a Mach-Zehnder Interferometer 604. The arms of the Mach-Zehnder Interferometer are of equal length. Phase modulators 603 and 605 are capable of shifting ±Φ and, in this illustrative embodiment, the amount of phase shift in the phase modulators is equal, but of opposite sign. The outputs of phase the phase shifters 603 and 605 are fed to a coupler 607. The outputs of the coupler 607 are fed to phase shifters 606 and 608. The signal entering the phase shifter 606 is shifted an additional 90° with respect to the signal entering the phase shifter 608. The output signals are routed through fibers F8 and F7, which substitute for the fibers F1 and F2, respectively, of FIG. 5.

The polarization controller 502 may be operated through use of high speed electrical control. The controller 502, phase modulators, delay lines, and other components may be constructed as integrated elements using integrated circuit processes. Such processes are described in K. Okamoto, et al, Fabrication of TE TM mode Splitter Using Completely Buried GaAs/GalAs Waveguide, Japanese Journal of Applied Physics Part 1, V34, 1, 1995, p 151–155, and T Kamabayashi, Analysis of a Novel Intersection Waveguide Type Optical Polarization Splitter Using Birefringence of GaInAsP.lnP Superlattice, Electronics and Communications in Japan, V79, 4 1996, pp. 20–29, which are hereby incorporated by reference in their entirety.

Figure 7:
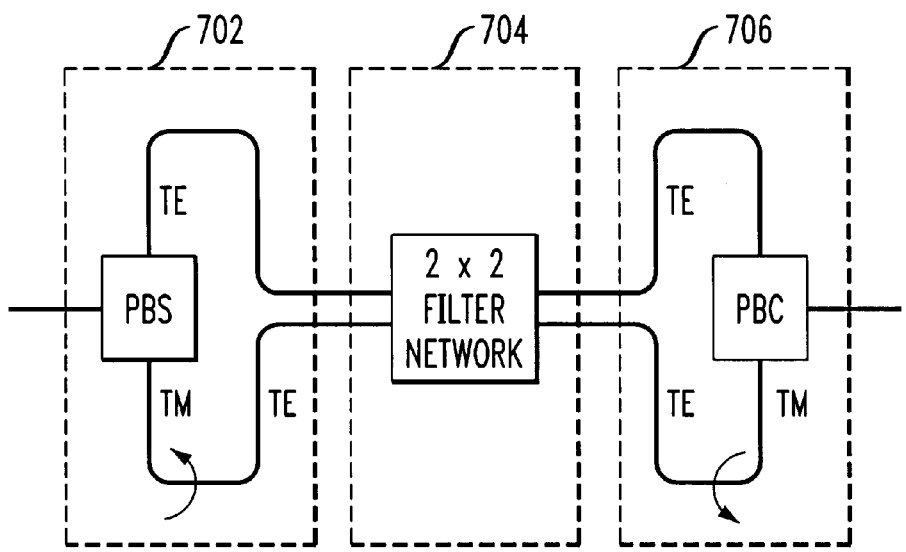
FIG. 7 is a functional level block diagram of a compensator which may be embodied as illustrated in FIGS. 5, 8, 10, and 12, for example.

The conceptual block diagram of FIG. 7 depicts a PMD compensator 700 in accordance with the principles of the present invention. The compensator includes a mode mapping device 702 which splits an incoming signal which is to be compensated into orthogonal modes, then rotates the polarization of one of the resulting modes to that of its orthogonal counterpart so that the two modes may constructively interfere. The two modes emerge from the mode mapping device and are applied to the inputs of a network 704 of one or more 2 by 2 lossless filters. Such filters are described in greater detail in the discussion related to FIGS. 8 through 11, which depict specific illustrative embodiments of the new PMD compensators. The network 704 may be a single such filter, a series combination, a parallel combination, or a series/parallel combination of such filters. As will be described in greater detail below, the network 704 is configured to exhibit a transfer function which, when matrix multiplied by the matrix representation of the transfer function of the fiber being compensated, produces the identity matrix. Following the filter network 704 the signals are fed through another mode mapping device 706 to produce a PMD compensated output signal.

In general, PMD compensation may be effected by a combination of the mode mapping, such as that of 702, followed by a lossless 2×2 filter network, such as 704, which is followed by another mode mapping such as 706. The incoming signal with arbitrary polarization is separated into two polarization modes (TE, TM) with a Polarization Beam Splitter/Combiner PBS/C connected to two pieces of polarization maintaining fiber (PMF). The split light is coupled into one of the PSP of the PMFs. By using a physical 90° rotation of one of the PMFs, the output fields have the same polarization when entering the filter network; consequently interference effects in the lossless filter network can be used for phase and amplitude control of the propagating modes. The inverse operation, constituting lossless free combining of both modes in one fiber, is done in a polarization beam combiner (PBC). By this method the spectral components of an arbitrary polarized wave are mapped to two waves with the same well-defined polarization enabling us to process the modes in unipolar (TE or TM guided) 2×2 filters. A general approach for an integrated, causal, lossless 2×2 filter network, in which the filter response is time limited and based only on wavelength independent devices, may be implemented as a chain of cascaded Mach-Zehnder-Interferometers (MZI). In order to simplify design for implementation, only frequency independent phase shifters and fixed delay lines within the MZI are assumed. Phase shifters are required for adaptation of the filter to time variations in the PMD channel. Any or all of these elements may be produced as an integrated combination using the integrated circuit techniques described above.

Figure 8:
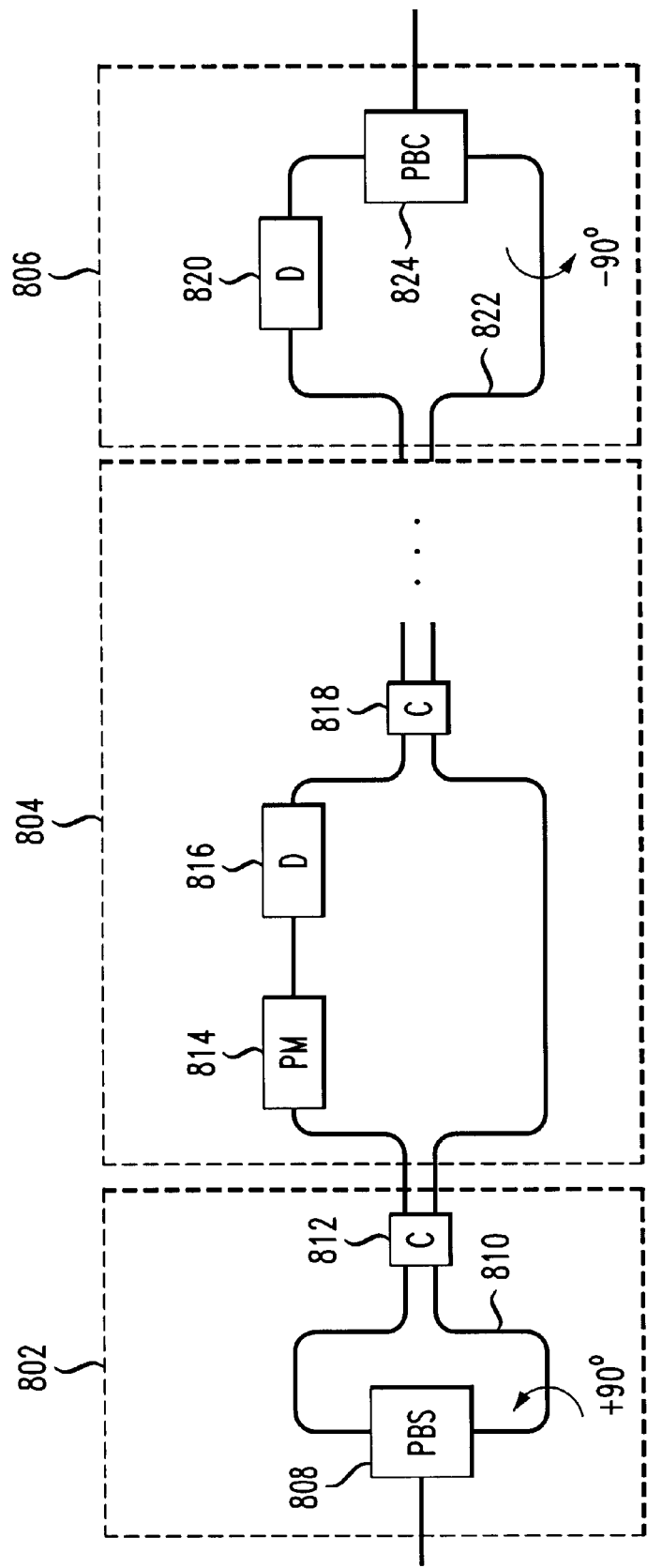
FIG. 8 is a conceptual block diagram of a compensator in accordance with the principles of the present invention in greater detail than that of FIG. 7.

The conceptual block diagram of FIG. 8 illustrates a PMD compensator in accordance with the principles of the present invention in greater detail than the diagram of FIG. 7. In particular, the mode mapping section 802, the 2×2 lossless filter network 804 and the mode mapping section 806 are comparable to the respective section, 702, 704, and 706 of FIG. 7. The mode mapping section 802 includes a polarization beam splitter PBS 808 which splits an incoming signal into its two fundamental polarization modes, the polarization rotation section 810 rotates one mode into its orthogonal counterpart and a coupler 812 couples the split signals, which exhibit parallel polarization, into the 2×2 lossless filter network 804. The filter network 804 includes at least one cell such as that formed by two branches, one of which includes a combination of the phase modulator 814 and fixed delay 816. The output of the filter network 804 is coupled into the mode mapping section 806 which includes a polarization rotation section 822 which rotates one of the split signals back into a mode orthogonal from the other, an optional fixed delay 820 which delays the other signal to better align the orthogonal modes and a polarization beam combiner 824 which combines the two signals into one. The fixed dealy 820 could be as little as zero delay, particularly for use in the compensation of higher order modes. Each cell of the 2×2 lossless filter network 804 is a Mach-Zehnder interferometer and the resulting combination yields a two mode allpass PMD filter. The entire PMD compensator of FIG. 8, or any section thereof may be implemented using the integrated circuit techniques discussed above.

The conceptual block diagrams of FIGS. 9A through 9B depict physical implementations of lossless unipolar 2×2 filters which may be employed to realize any of the cells which contribute to the lossless filter network 804 of FIG. 8. The conceptual block diagrams are accompanied by Jones Matrix representations of their transfer functions. The Jones Matrix transfer function representations of FIGS. 9B and 9C, for example, indicate that the related physical implementations respectively operate as a 3 dB coupler and a Mach-Zehnder interferometer. The form of the Jones Matrix representation of the lossless unipolar 2×2 filters:

$$2 \times 2 \text{ filter:} \quad \begin{pmatrix} A'(\omega) \\ B'(\omega) \end{pmatrix} = e^{j\gamma(\omega)} \underline{U}(\omega) \begin{pmatrix} A(\omega) \\ B(\omega) \end{pmatrix} \quad (8)$$

is the same as that of a PMD fiber:

$$\text{PMD fiber:} \quad \begin{pmatrix} A'(\omega) \\ B'(\omega) \end{pmatrix} = e^{j\gamma(\omega)} \underline{U}(\omega) \begin{pmatrix} A(\omega) \\ B(\omega) \end{pmatrix} \quad (9)$$

As previously noted, in accordance with the principles of the present invention, a 2×2 lossless filter network is employed to physically realize the inverse matrix $U^{-1}(\omega)$ [or $M^{-1}(\omega)$].

Figure 10:
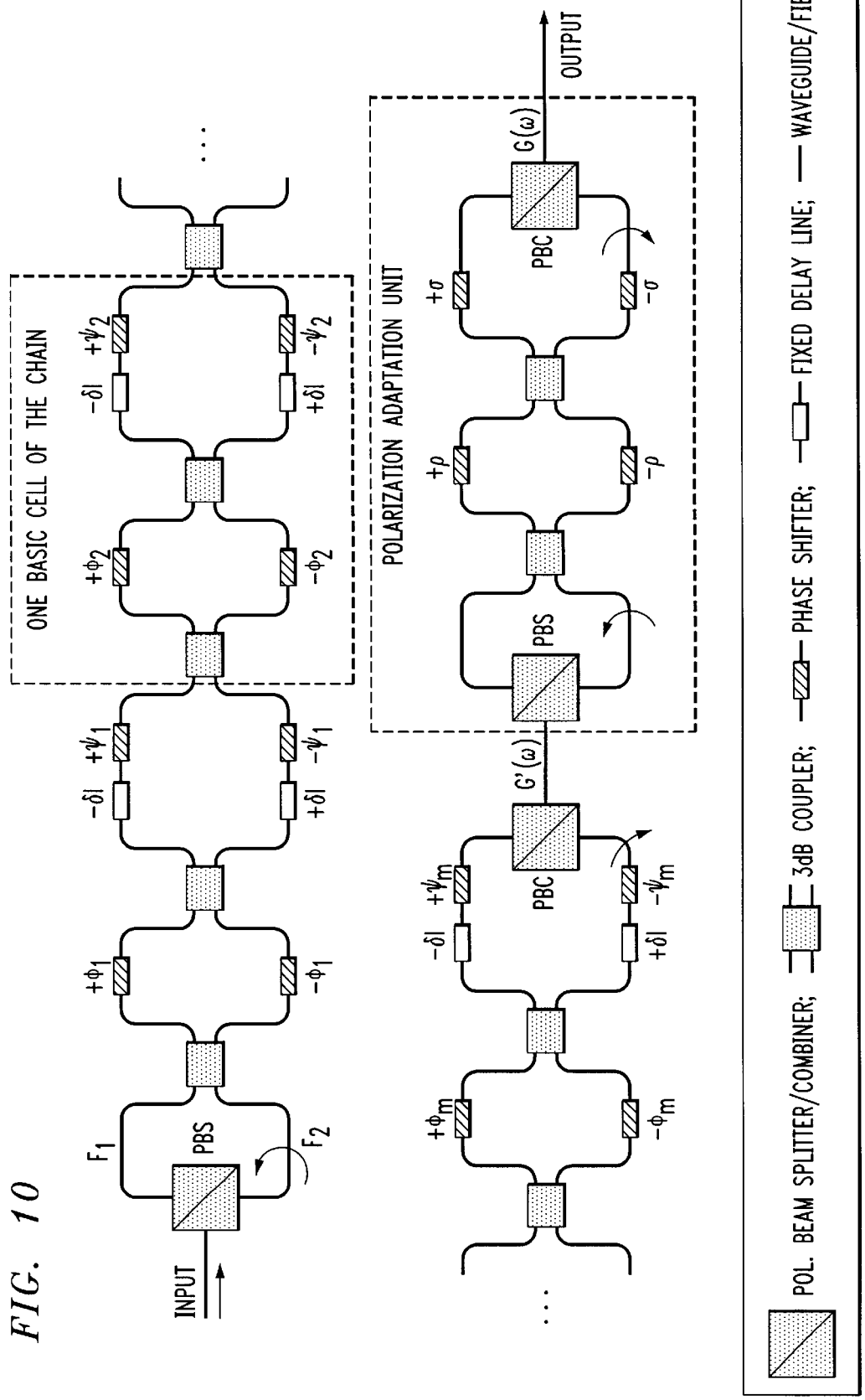
FIG. 10 is a conceptual block diagram of a filter network particularly suitable for broadband PMD compensation.

The illustrative embodiment of FIG. 10 depicts a filter combination 1000 particularly suitable for broadband PMD compensation. One basic cell 10002 of the filter chain contains a 3 dB coupler followed by two phase shifters generating complementary phase shifts of $+\phi$ and $-\phi$ in the MZ arms, a 3 dB coupler with two different long delay lines connected to its output ports and additional phase shifters generating $+\Psi$ and $-\Psi$. Using a symmetrically built MZI permits an easier mathematical description, so without loss of generality we assume negative delay lines in one arm of the MZI. The phase shifts $\phi_k$, $\Psi_k$ in the chain may be determined as follows. The transfer matrix corresponding to structures such as illustrated in the conceptual block diagram of FIG. 10 may be used to approximate a desired unitary matrix to within any degree of accuracy. Particularly, we could approximate $P M^{-1}(\omega)$ over a frequency band.

Figure 11:
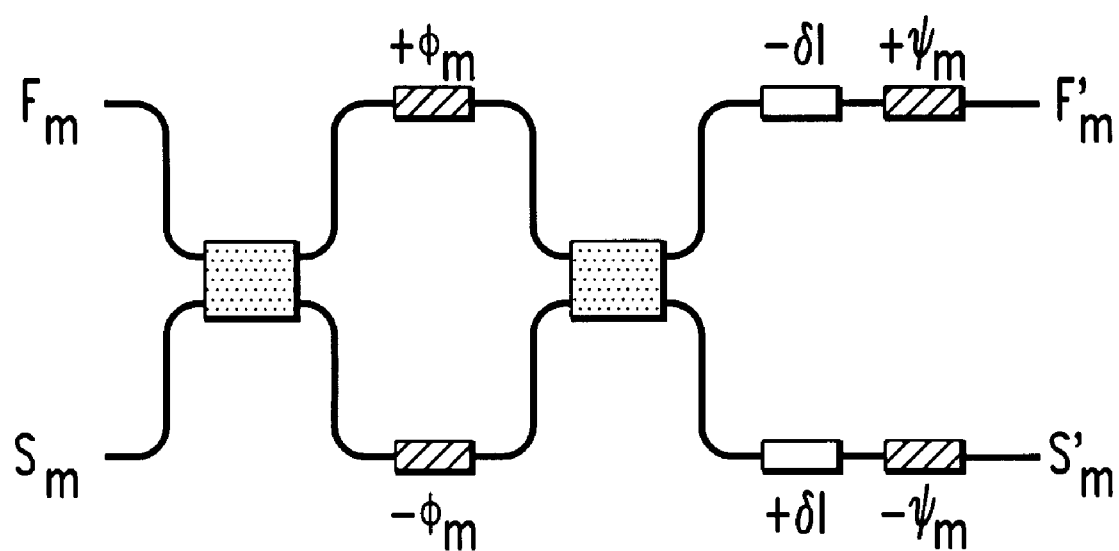
FIG. 11 is a block diagram of a component cell of the network of FIG. 10.

The filter function of one basic cell of the MZI chain as illustrated in the conceptual block diagram of FIG. 11 may be described as follows. Assume a time sequence of equally spaced Dirac pulses $F_m = [F(0), \ldots, F(k)]$ and $S_m = [S(1), \ldots, S(k+1)]$ which are entering the basic cell and are projected to the output series' $F'_m = [F'(0), \ldots, F'(k+1)]$ and $S'_m = [S'(1), \ldots S'(k+2)]$, respectively, where the argument index stands for the time evolution of the series' (e.g. $t = \Delta t \, k$), assuming that the time spacing of the pulses is equivalent to $\Delta t = 2\delta l/c_{eff}$. A time delay between the corresponding input and output series' is irrelevant for the filter process description because only relative phase differences between Fm and Sm or F'm and S'm are causing interference effects respectively. Due to the fact that the delay in the arm of port F' is $2\delta l/c_{eff}$ shorter than in the arm with port S' the assumptions $S'(0)=0$ and $F'(k+2)=0$ are physically reasonable and expressed in the definition by leaving out these terms in the corresponding series. Hence, the transformation matrix of one basic cell for the input vector $ym=[F(0), \ldots, F(k), S(1), \ldots, S(k+1)]$ and the output vector $y'm=[F'(0), \ldots, F'(k+1), S'(1), \ldots, S'(k+2)]$, is given by $$y'_m = -j[T]y_m \quad (10)$$

with:

$$[T] = \begin{vmatrix} -\sin(\phi_m)e^{j\psi_m} & 0 & 0 & \vdots & 0 & 0 & \vdots & 0 & 0 & 0 \\ 0 & -\sin(\phi_m)e^{j\psi_m} & 0 & \vdots & 0 & \cos(\phi_m)e^{j\psi_m} & 0 & \vdots & \vdots & \vdots \\ \vdots & 0 & \cdots & 0 & \vdots & 0 & \cos(\phi_m)e^{j\psi_m} & 0 & \vdots & \vdots \\ \vdots & \cdots & 0 & -\sin(\phi_m)e^{j\psi_m} & 0 & \vdots & 0 & \cdots & 0 & 0 \\ \vdots & \cdots & \cdots & & 0 & \vdots & \vdots & 0 & \cos(\phi_m)e^{j\psi_m} & 0 \\ 0 & 0 & \cdots & \vdots & \vdots & \vdots & 0 & 0 & 0 & \cos(\phi_m)e^{j\psi_m} \\ \cos(\phi_m)e^{-j\psi_m} & 0 & 0 & \vdots & 0 & 0 & \cdots & \cdots & \vdots & 0 \\ 0 & \cos(\phi_m)e^{-j\psi_m} & 0 & \vdots & 0 & \sin(\phi_m)e^{-j\psi_m} & 0 & \cdots & \vdots & \vdots \\ 0 & 0 & \cdots & \cdots & \cdots & 0 & \sin(\phi_m)e^{-j\psi_m} & 0 & \vdots & \vdots \\ \vdots & \cdots & \cdots & \cdots & 0 & \cdots & \cdots & \cdots & \vdots & \vdots \\ 0 & \cdots & \cdots & 0 & \cos(\phi_m)e^{-j\psi_m} & 0 & \cdots & 0 & \sin(\phi_m)e^{-j\psi_m} & 0 \\ 0 & 0 & \cdots & 0 & 0 & 0 & \cdots & \cdots & 0 & \sin(\phi_m)e^{-j\psi_m} \end{vmatrix} \quad (11)$$

For a given vector y'$_m$ a solution for y$_m$ exists if and only if the rank of [T] which is 2k+2 equals the rank of the augmented matrix [T, y'm]. Since φ$_m$ has to be real the condition which needs to be satisfied is $$S'(k+2)(F(k+1))^{-1} = -\tan(\phi_m)e^{j2\psi_m} \quad (12)$$

Outside the frequency interval ω0−Ω/2≦ω≦ω0+Ω/2 the elements {g11(ω), g12(ω), . . . } of the JM G(ω) which we are constructing are understood to continue (e.g. g12(ω+Ω)=g12(ω)). To simplify the mathematical discussion, assume that the Fourier series' have a limited number of terms. After some mathematical steps using |g11(ω)|2+|g12(ω)|2=1 one can find that the elements of G'(ω) (see FIG. 10 for the definition) can be written as $$g'_{11}(\omega) = e^{j(n\omega T)}\sum_{p=0}^{k+1}\Gamma_1(p)e^{-j(p\omega T)} \quad (13)$$

$$g'_{12}(\omega) = e^{j(n\omega T)}\sum_{p=1}^{k+2}\Gamma_2(p)e^{-j(p\omega T)}$$

where n is an integer, T=2π/Ω and g'11 correspond the output of ψ$_m$ of the previous chain cell. The inverse Fourier transform leads, in the time domain, to two series' of Dirac pulses weighted by Γ$_1$ and Γ$_2$, respectively. By associating of Γ$_1$(q) with F'(q) and Γ$_2$(q) with S'(q) and by 2δl equaling 2π c/Ω and by choosing φm , Ψm as given in (12) the input vector ym is two elements smaller than the output vector y'm in (13). By successive repetition of this process for each of the k+2 chain cells, a two element vector with one zero element remains describing the input signal. This means that the filter chain now generates exactly the jones matrix (JM) G(ω) which could be the inverse JM of a PMD fiber. The last stage in the filter called the polarization adaptation unit is not necessary for PMD compensation. The phase operation that it performs can not influence the O/E conversion in a receiver which is based on square law detection. An interruption after a reasonable term number in the Fourier series' and a similar procedure, results, at least, in a partial PMD compensation.

Figure 12:
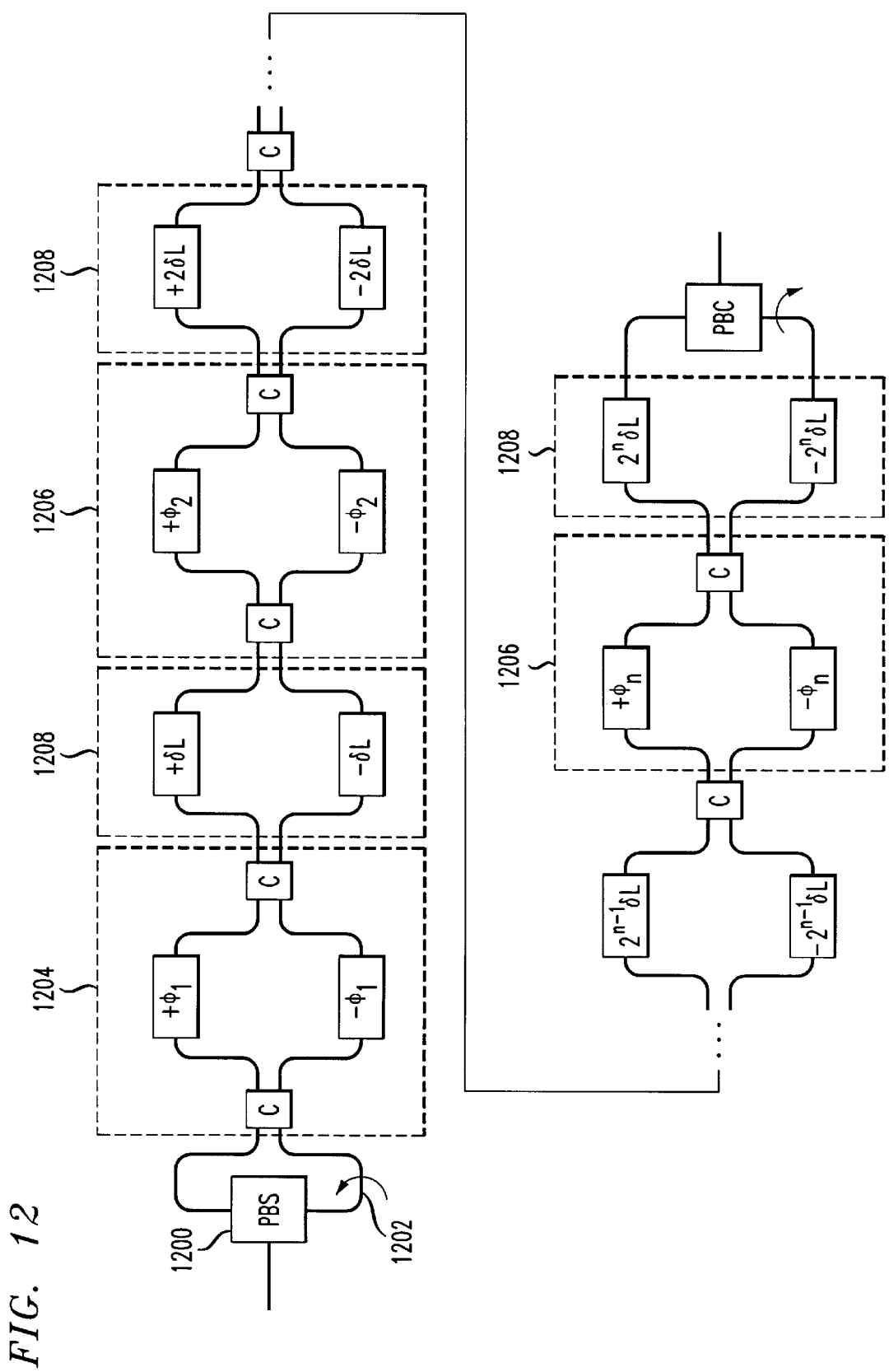
FIG. 12 is a conceptual block diagram of a first order single channel PMD compensator in accordance with the principles of the present invention.

The conceptual block diagram of FIG. 12 illustrates a single channel 1$^{st}$ order PMD compensator in which the novel lossless 2×2 filter network includes one or more Mach-Zehnder switches arranged to select geometrical scaled delay lines. A polarization beam splitter 1200 splits an incoming optical signal into TE and TM modes and one of the modes is converted into its orthogonal counterpart by the device 1202. A rotator 1204 adapts the polarization between the filter string and the channel, or input fiber. The phase modulators Φ$_1$ and −Φ$_1$ of the rotator 1202 are continuously variable over the range [0,π]. The rotator is followed by one or more Mach-Zehnder switches 1206 and geometrical delays 1208. The Mach Zehnder switches 1006 include phase modulators Φ$_2$ and −Φ$_2$ which take on the value 0 or π, thereby switching a signal to either of the following geometrical delays. The maximum 1$^{st}$ order PMD compensation available with such a compensator is given by:

$$(2^{\{n+1\}}-1)2\delta L \quad (14)$$

with $$PMD<2\delta L \quad (15)$$

A wide variety of PMD filters specific to different applications may be designed by employing different cells in the network for use with the described mode mapping method. For example, choosing ψ1, . . . , ψm=0; 0≦φ1≦π; φ2, . . . , φm∈{0, π/2} and a geometrically increased scaling of the delay lines in the basic cells (e.g. 1st cell: {+δl−δl}; 2nd cell: {+2δl,−2δl}, . . . , m$^{th}$ cell: {+2$^m$δl,−2$^m$δl } results in an approach suitable for high efficient compensation of Differential Group Delay (DGD) amounts up to ($2^{m+1}$−1) 2δl/c$_{eff}$ with a quantization error visible in a residual 1st order PMD at DGD<2δl/c$_{eff}$. Some aspects of the above filter analysis are discussed in S. E. Harris et al, J. Opt Soc. Am, pp 1267–79, 1964 which is hereby incorporated by reference.

Figure 13:
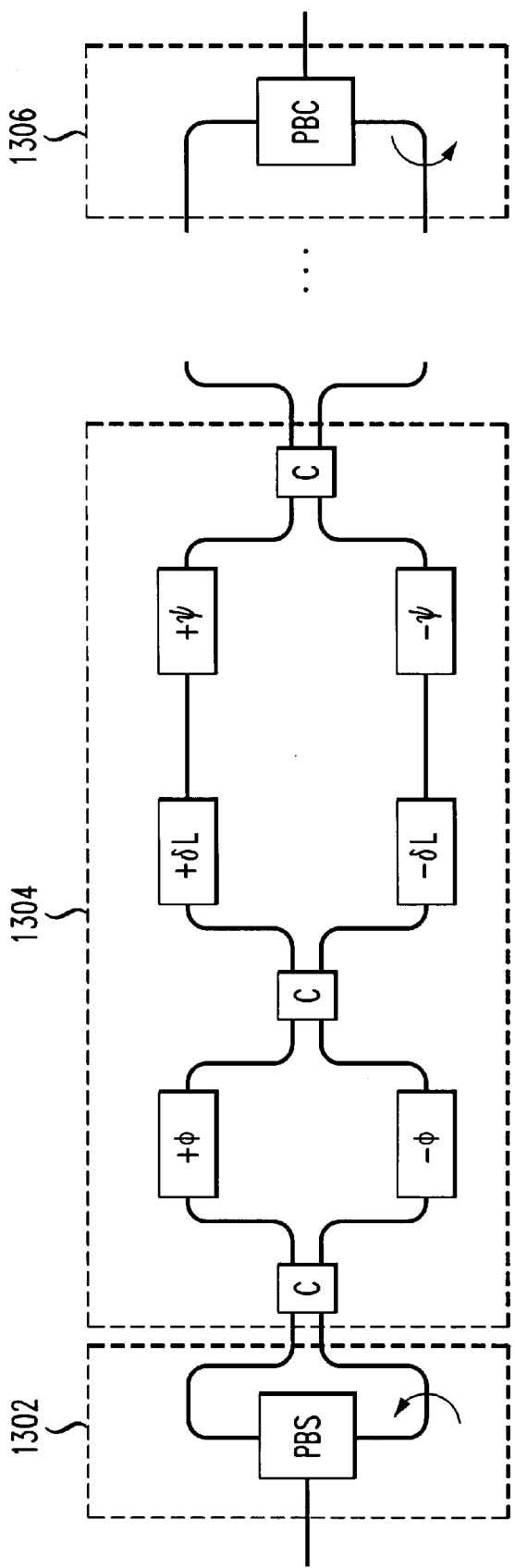
FIG. 13 is a conceptual block diagram of a multichannel PMD compensator in accordance the principles of the present invention.

Multi-channel PMD compensation, for use in wavelength division multiplexing (WDM) systems, for example, may be achieved in a compensator in accordance with the principles of the present invention, as illustrated in the conceptual block diagram of FIG. 13. The compensator 1300 employs PMD function interleaving to create an artificial inverse PMD which it compensates for. The mode mapping sections 1302 and 1306 are as previously described. In this case, the 2×2 lossless filter network includes cells such as the cell 1304. The basic cell 1304 includes phase modulators Φ and −Φ followed by a coupler c. The coupler is followed by fixed delays δL and −δL and phase modulators Ψ and −Ψ. The period of the artificial PMD equals, for example, N(channel spacing)−bandwidth of a channel.

Figure 14A:
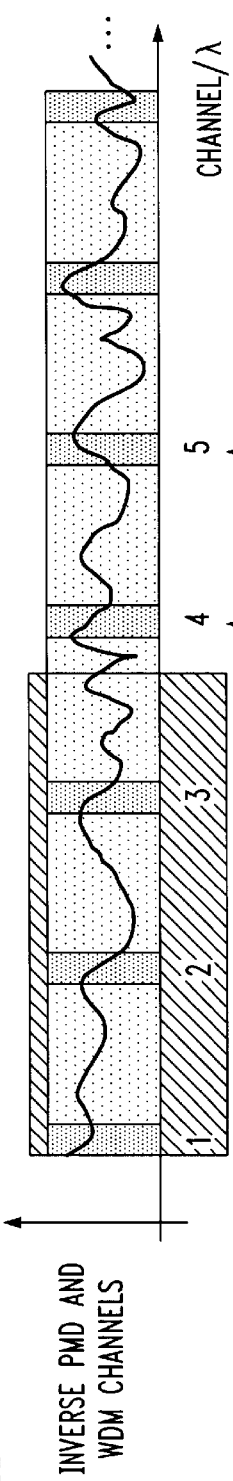
FIGS. 14A and 14B are, respectively, plots of one element of an inverse Jones Matrix versus frequency and of the interleaved resultant in accordance with the principles of the present invention.
Figure 14B:
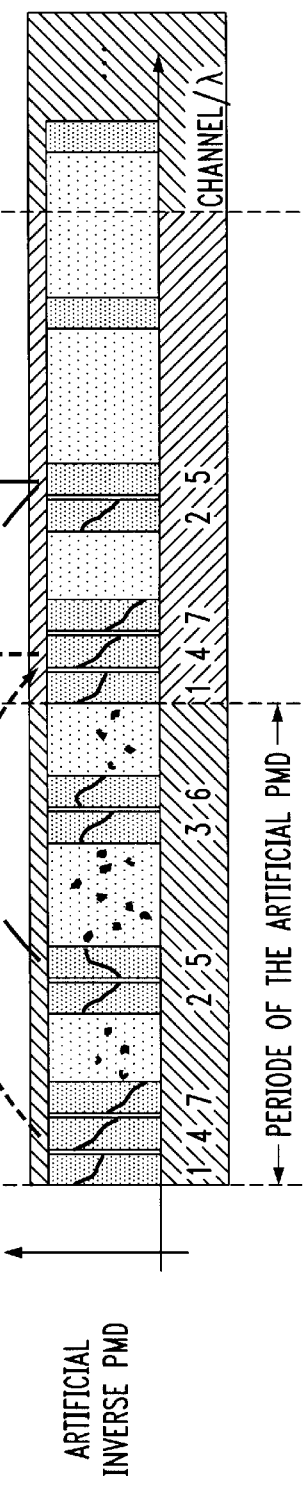

In WDM systems each channel can be PMD compensated after optical demultiplexing by separated independent devices. According to the principles of the present invention, all the channels may be compensated simultaneously in a single device. To simplify the device, PMD compensation is only done in frequency intervals where the spectra of WDM channels reside. Therefore an artificial inverse JM of the PMD fiber is constructed with a period of e.g. N Bhc−Bsi, where N is an integer, Bhc stands for the channel spacing in the WDM system and Bsi is the signal bandwidth. FIG. 14A plots one element of the inverse fiber JM versus frequency. As indicated in FIG. 14B, a specific choice of interleaved matrix function sections results due to the period in an emulation of the inverse fiber PMD in frequency intervals of the WDM channels. Hence, this artificial inverse JM can be used as PMD compensation matrix within the channel bandwidth and constructed by the method described above. As illustrated in FIG. 14B, discontinuities between two sections in the artificial matrix can appear. For an accurate analysis many terms of the corresponding Fourier series' have to be taken into account. However, due to the fact that only a small fraction of the signal power in a channel is located at the borders of its bandwidth, a smooth interpolation between these sections could in some cases result in Fourier series' with a smaller number of terms and a good fit.

Figure 15:
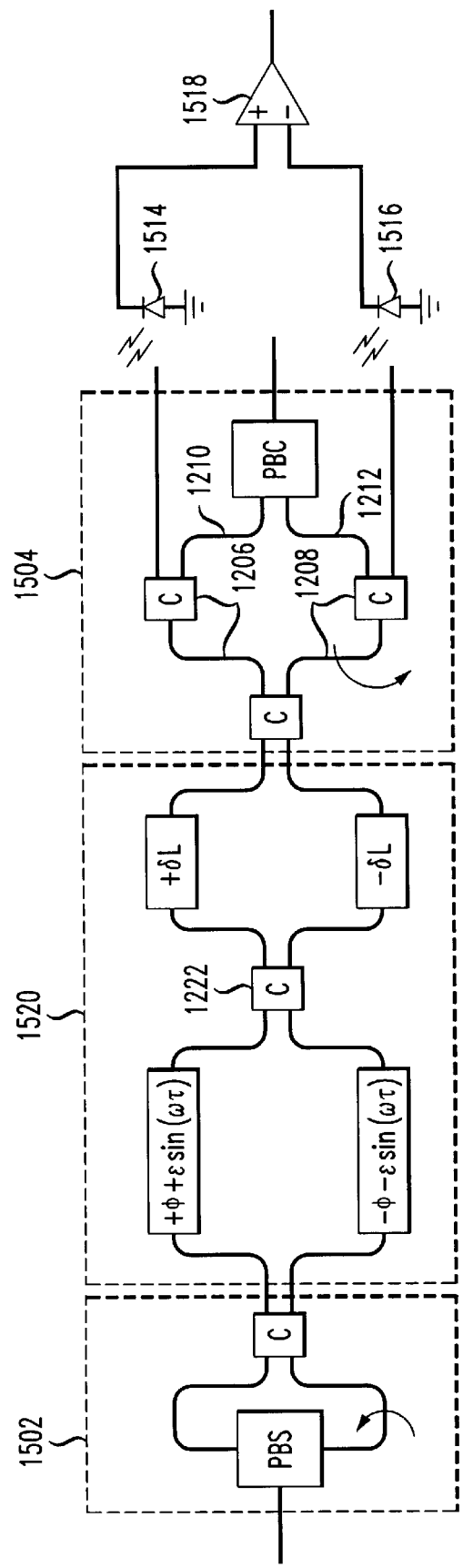
FIG. 15 is a conceptual block diagram of a PMD compensation monitor in accordance the principles of the present invention.

The effectiveness of PMD compensation may be monitored in accordance with the principles of the present invention with a device 1500 as depicted in the conceptual block diagram of FIG. 15. Mode mapping sections 1502 and 1504 are as previously described, with the exception that mode mapping section 1504 includes taps 1506 and 1508 used to sample the signal from arms 1510 and 1512 of the mode mapping section 1504. The sampled signals are routed to photodiodes 1514 and 1516 where the signals are converted to electrical form and fed to the inputs of a differential amplifier 1518. The lossless 2×2 filter section 1520 includes phase modulators +φ+εsin(ωτ) and −φ−εsin (ωτ). The phase modulators are followed by a coupler 1522 which routes the signals to fixed delays +δl and −δl. The value of ω, which is not the same as the signal frequency, may be in the kilohertz range, and could be selected to track variations in environmental conditions which alter the PMD characteristics of a fiber that is being compensated. If the phase modulators +φ+εsin(ωτ) and −φ−εsin(ωτ) are correctly adjusted, the output of the amplifier at the fundamental frequency ω and its odd overtones will be relatively weak, and relatively strong at the even overtones. Different tones may be used in sampling the different phase modulators of filter network, thereby permitting one to separately sample the performance of a plurality of phase modulators. This performance information may be employed to control phase modulators through a negative feedback system, for example. The value of φ may vary from 0 to π and the value of ε is preferably substantially smaller than φ, as little as 0.01φ, for example.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. Apparatus for compensating the polarization mode dispersion (PMD) of an optical signal imparted by a device, said device characterized by a transfer function U, said apparatus comprising:
   a first mode mapper responsive to the reception of a randomly polarized optical signal by dividing the signal into orthogonally polarized component signals and routing each of the component signals into a separate path, with one of the separate paths configured to rotate the polarization state of one of the component signals until it is parallel to the polarization of the other component signal;
   a lossless two by two filter network connected to receive the component signals from the mode mapper, the filter network being characterized by a transfer function $U^{-1}$ that is the inverse of the transfer function of the device which imparts polarization mode dispersion to the optical signal; and
   a second mode mapper responsive to the reception of a the orthogonally polarized component signals by combining the signals into an optical signal characterized by substantially less PMD than the optical signal received at the first mode mapper.

2. Apparatus of claim 1 wherein said first mode mapper comprises:
   a polarization beam splitter configured to split an incoming, randomly polarized optical signal into separate orthogonally polarized component signals; and
   first and second optical paths connected to receive the orthogonally polarized component signals from the polarization beam splitter, one of the optical paths including a polarization rotator configured to rotate the polarization of the component signal travelling in the optical path to an orientation that is parallel with that of the orthogonal component signal within the other optical path.

3. The apparatus of claim 2 wherein the polarization rotator is an optical fiber that is rotated through 90° along its length.

4. The apparatus of claim 2 wherein each of the first and second optical paths comprises a polarization maintaining optical fiber (PMF).

5. The apparatus of claim 1 wherein the filter network comprises at least two filter cells connected in series.

6. The apparatus of claim 5 wherein each cell within the filter network comprises a Mach-Zehnder Interferometer (MZI).

7. The apparatus of claim 6 wherein each MZI comprises two optical paths, with one optical path providing a first delay relative to the other optical path.

8. The apparatus of claim 7 wherein each MZI further comprises a phase modulator that produces an adjustable delay, of lesser magnitude than the first delay, within one optical path relative to the other optical path.

9. The apparatus of claim 8 wherein the filter cells are connected in series and include one or more Mach-Zehnder switches connected to select among geometrical scaled delay lines.

10. The apparatus of claim 8 wherein the filter network exhibits a transfer function that is an artificial inverse jones matrix (JM) created by PMD function interleaving.

11. The apparatus of claim 10 wherein the artificial inverse JM is constructed with a period of N(Bhc)−Bsi, where N is an integer, Bhc is the channel spacing of the WDM system, and Bsi is the bandwidth of the signal for which PMD is being compensated.

12. Apparatus of claim 1 further comprising:
   a monitoring network connected to receive a portion of at least one of the signals within the second mode mapper and to produce a monitoring output signal; and
   a modulating input connected to the filter network to respectively modulate the phases of first and second orthogonally polarized signals within the filter network by $+\phi+\varepsilon\ \sin(\omega\tau)$ and $-\phi-\varepsilon\ \sin(\omega\tau)$.

13. Apparatus of claim 12 further comprising a feedback circuit connected to control the modulation of the phases of the first and second orthogonally polarized signals in response to variation in the monitoring output signal.

14. Apparatus of claim 1 wherein said first mode mapper is implemented as an inegrated optical device.

15. Apparatus of claim 1 wherein one or more component elements of said lossless two by two filter network is implemented as an integrated optical device.

16. Apparatus of claim 1 wherein one or more elements of said second mode mapper is implemented as an integrated optical device.

17. A polarization mode dispersion emulator comprising:
   a first optical network exhibiting the transfer matrix $$R^{+1}(\omega) = \begin{bmatrix} \cos(k\omega) & +\sin(k\omega) \\ -\sin(k\omega) & \cos(k\omega) \end{bmatrix}$$

a second optical network connected to receive the output of the first optical network and exhibiting the transfer matrix $$D(\omega) = \begin{bmatrix} d(\omega) & 0 \\ 0 & d^*(\omega) \end{bmatrix};$$

and
   a third optical network connected to receive the output of the second optical network and exhibiting the transfer matrix $$R^{-1}(\omega) = \begin{bmatrix} \cos(k\omega) & -\sin(k\omega) \\ +\sin(k\omega) & \cos(k\omega) \end{bmatrix}$$

where:
   $d(\omega) = \exp(j(\Delta\tau_0\omega + (1/2)\Delta\tau_1\omega^2)/2)$.

18. A method of compensating for polarization mode dispersion (PMD) imparted to an optical signal by a device characterized by a transfer function U, said method comprising the steps of:

(A) in a first mode mapper, mapping the polarization modes of a randomly polarized optical signal by dividing the signal into orthogonally polarized component signals and routing each of the component signals into a separate path, with one of the separate paths configured to rotate the polarization state of one of the component signals until it is parallel to the polarization of the other component signal;

(B) passing the mode-mapped component signals from the first mode mapper through a lossless two by two filter network connected to receive the component signals from the first mode mapper, the filter network being characterized by a transfer function $U^{-1}$ that is the inverse of the transfer function of the device which imparts polarization mode dispersion to the optical signal; and (C) in a second mode mapper, mapping the polarization modes of the filtered component optical signals received from the filter network by rotating one of the filtered component signals to a polarization state orthogonal to that of the other filtered component signal and combining the component signals in a polarization beam combiner.

19. The method of claim 18 wherein step (A) comprises the steps of:

(A1) splitting the randomly polarized optical signal in a polarization beam splitter into separate orthogonally polarized component signals (A2) coupling the orthogonally polarized component signals from the polarization beam splitter into separate optical paths; and (A3) rotating the polarization of one of the component signals in a polarization rotator to a polarization that is parallel to that of the component signal within the other optical path.

20. The method of claim 19 wherein the component signal is rotated in step (A3) by a polarization maintaining optical fiber that is rotated through 90° along its length.

21. The method of claim 18 wherein the filter network of step (B) comprises a network of cells, each of which comprises a Mach-Zehnder Interferometer (MZI).

22. The method of claim 21 wherein step (B) comprises the step of:

(B1) passing each component signal through a separate path of a MZI, with one optical path providing a first delay relative to the other optical path.

23. The method of claim 22 wherein step (B) comprises the step of:

(B2) adjusting a delay, of lesser magnitude than the first delay, within one optical path relative to the other optical path.

24. The method of claim 23 wherein step (B) comprises the step of:

(B3) switching the component signals through geometrical scaled delay lines, using Mach-Zehnder switches to select among geometrical scaled delay lines.

25. The method of claim 23 wherein step (B) further comprises the step of:

(B4) interleaving a wavelength division multiplexed signal to produce a filter network characterized by an artificial inverse jones matrix (JM).

26. The method of claim 25 wherein step (B4) comprises the step of:

(B5) constructing the artificial inverse JM with a period of N(Bhc)–Bsi, where N is an integer, Bhc is the channel spacing of the WDM system, and Bsi is the bandwidth of the signal for which PMD is being compensated.

27. The method of claim 18 further comprising the step of:

(D) tapping a portion of at least one of the signals within the second mode mapper to produce a monitoring output signal; and (E) respectively modulating the phases of first and second orthogonally polarized signals within the filter network by $+\phi+\varepsilon \sin(\omega_m\tau)$ and $-\phi-\varepsilon \sin(\omega_m\tau)$, where $\omega_m$ is a monitoring signal frequency.

28. The method of claim 27 further comprising the step of:

(F) feeding back the monitoring output signal to control the modulation of the phases of the first and second orthogonally polarized signals.

29. A method of emulating polarization mode dispersion comprising the steps of:

(A) rotating an optical signal in an optical network characterized by a frequency dependent rotatation matrix $$R^{+1}(\omega) = \begin{bmatrix} \cos(k\omega) & +\sin(k\omega) \\ -\sin(k\omega) & \cos(k\omega) \end{bmatrix}$$

(B) delaying the principle states of polarization of the signal in an optical network characterized by a frequency dependent rotation matrix $$D(\omega) = \begin{bmatrix} d(\omega) & 0 \\ 0 & d^*(\omega) \end{bmatrix};$$

and (C) rotating an optical signal in an optical network characterized by a frequency dependent rotatation matrix $$R^{-1}(\omega) = \begin{bmatrix} \cos(k\omega) & -\sin(k\omega) \\ +\sin(k\omega) & \cos(k\omega) \end{bmatrix}$$

where:
$d(\omega)=\exp(j(\Delta\tau_0\omega+(1/2)\Delta\tau_1\omega^2)/2)$.

* * * * *